(12) United States Patent
Tanabe et al.

(10) Patent No.: US 9,774,554 B2
(45) Date of Patent: Sep. 26, 2017

(54) DEVICE MANAGEMENT SYSTEM, DEVICE MANAGEMENT APPARATUS, COMMUNICATION DEVICE, AND CONTROL METHODS THEREFOR, AND STORAGE MEDIUM

(71) Applicant: CANON KABUSHIKI KAISHA, Tokyo (JP)

(72) Inventors: Koichi Tanabe, Kawasaki (JP); Satoshi Igeta, Kawasaki (JP); Satoshi Ishizu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 176 days.

(21) Appl. No.: 14/474,458

(22) Filed: Sep. 2, 2014

(65) Prior Publication Data
US 2015/0067079 A1  Mar. 5, 2015

(30) Foreign Application Priority Data

Sep. 3, 2013  (JP) ................................. 2013-182076

(51) Int. Cl.
  *H04L 12/58*  (2006.01)
  *H04L 29/06*  (2006.01)
(52) U.S. Cl.
  CPC ............. *H04L 51/24* (2013.01); *H04L 51/28* (2013.01); *H04L 63/10* (2013.01)
(58) Field of Classification Search
  CPC ........ H04L 51/24; H04L 51/28; H04L 63/083
  (Continued)

(56) References Cited

U.S. PATENT DOCUMENTS 8,271,595 B2 *  9/2012  Qureshi ................ H04L 12/581
                                                    709/206
2003/0023695 A1 *  1/2003  Kobata ................ G06Q 10/107
                                                    709/206
(Continued)

FOREIGN PATENT DOCUMENTS

JP          6-195307 A       7/1994
JP          06195307 A   *   7/1994
(Continued)

*Primary Examiner* — Brian J Gillis
*Assistant Examiner* — Steve Lin
(74) *Attorney, Agent, or Firm* — Canon USA Inc., IP Division

(57) ABSTRACT

A device management system including the device management apparatus and a plurality of communication devices capable of communicating with the device management apparatus via the network stores destination information received from a first communication device and first identification information corresponding to the first communication device in association with address information, transmits the address information according to the destination information, transmits screen information to a second communication device in response to access from the second communication device using the address information, stores, when it receives service-related information input according to the screen information from the second communication device, the service-related information in association with second identification information for uniquely specifying the service-related information and the first identification information corresponding to the address information, and notifies the first communication device of the second identification information stored in association with the first identification information.

11 Claims, 13 Drawing Sheets

(58) Field of Classification Search
USPC .......................................................... 709/206
See application file for complete search history.

(56) References Cited

U.S. PATENT DOCUMENTS

| | | | | |
|---|---|---|---|---|
| 2009/0222531 | A1* | 9/2009 | London ................. | H04L 67/025 709/217 |
| 2010/0159965 | A1* | 6/2010 | Pascal ................. | H04L 12/5835 455/466 |
| 2011/0314111 | A1* | 12/2011 | Wang ..................... | G06Q 10/10 709/206 |
| 2012/0173612 | A1* | 7/2012 | Vegesna-Venkata ... | G06F 17/24 709/203 |
| 2012/0198017 | A1* | 8/2012 | LeVasseur .............. | H04L 51/24 709/206 |
| 2013/0055368 | A1* | 2/2013 | Bauckman .............. | H04L 51/24 726/7 |
| 2015/0073890 | A1* | 3/2015 | Nobutani ............. | G06Q 20/209 705/14.38 |

FOREIGN PATENT DOCUMENTS

| | | |
|---|---|---|
| JP | 2007-184886 A | 7/2007 |
| JP | 2011-004130 A | 1/2011 |

* cited by examiner

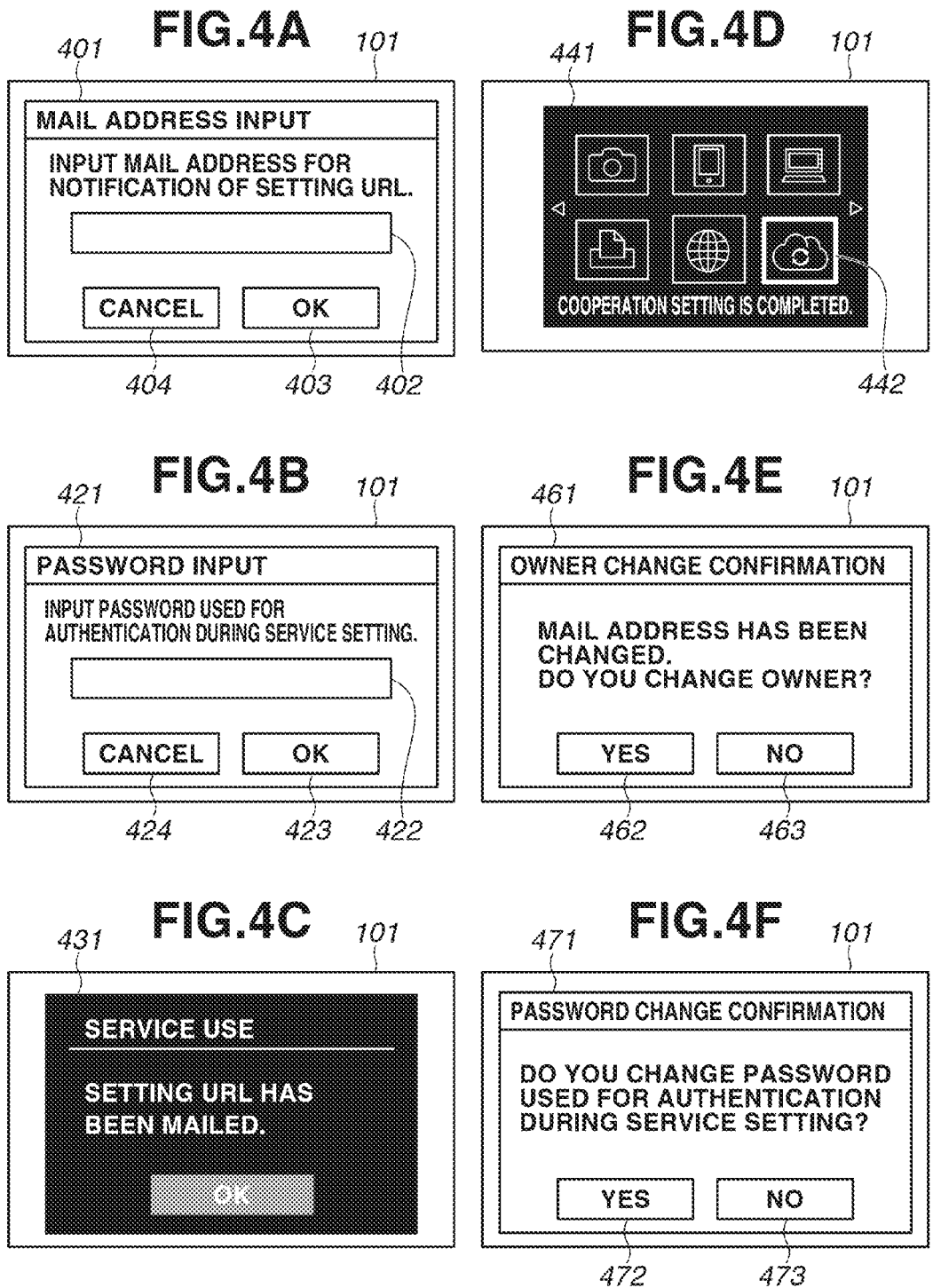

FIG.5A

| MANAGEMENT ID (501) | SETTING URL (502) | PASSWORD (503) | 510 |
|---|---|---|---|
| 001 | https://xxx.yyy.zzz | pass999 | |
| ... | ... | ... | |

FIG.5B

| MANAGEMENT ID (521) | MAIL ADDRESS (522) | 520 |
|---|---|---|
| 001 | abc@def.gh | |
| ... | ... | |

FIG.5C

| MANAGEMENT ID (501) | SETTING URL (502) | PASSWORD (503) | MAIL ADDRESS (534) |
|---|---|---|---|
| 001 | https://xxx.yyy.zzz | pass999 | abc@def.gh |
| ... | ... | ... | ... |

530

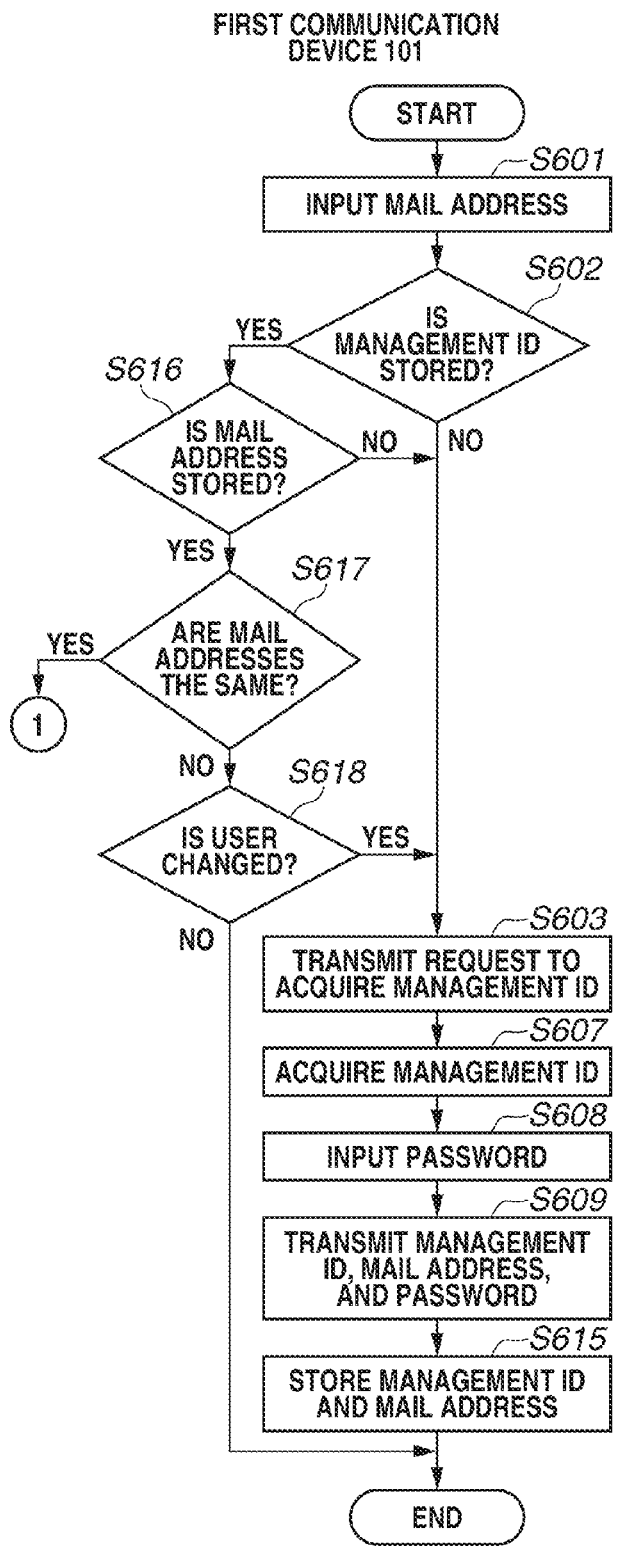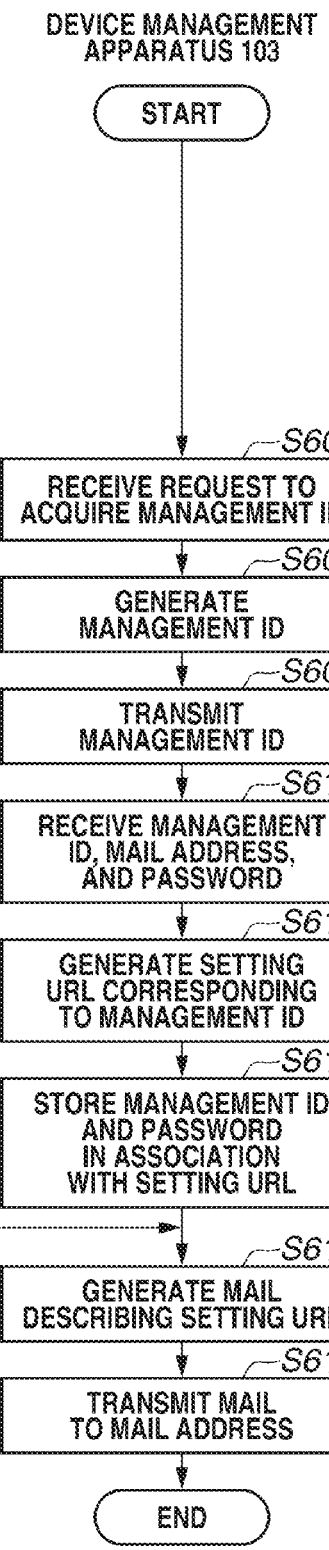

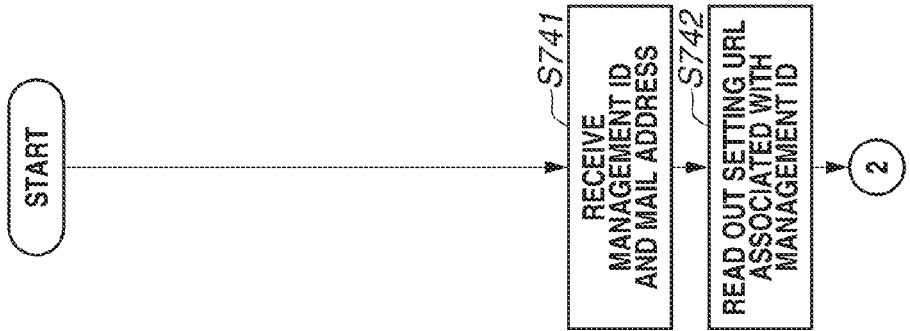
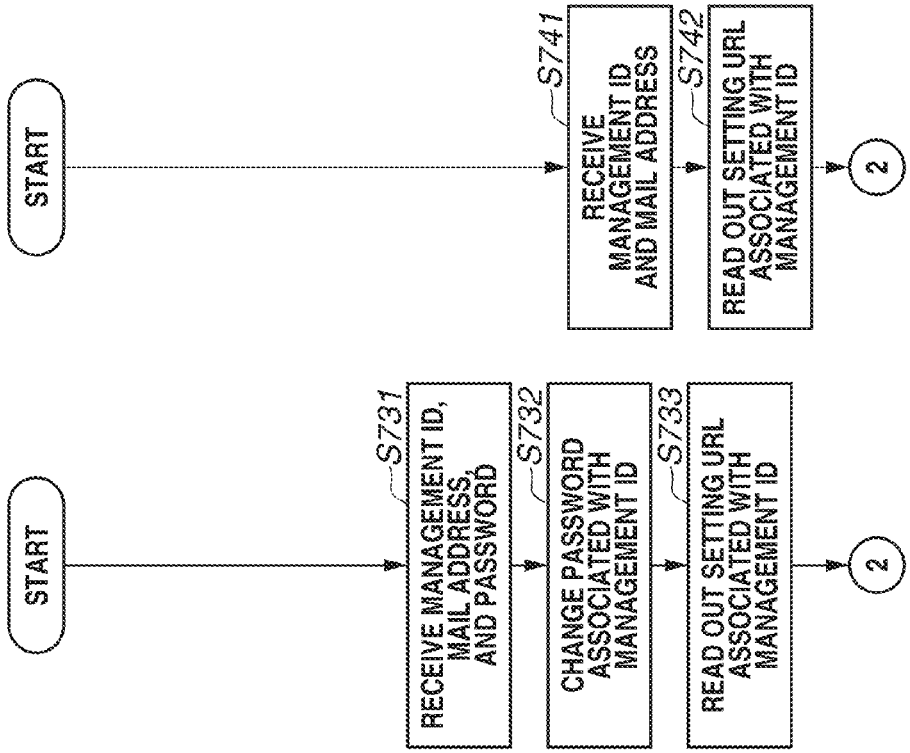
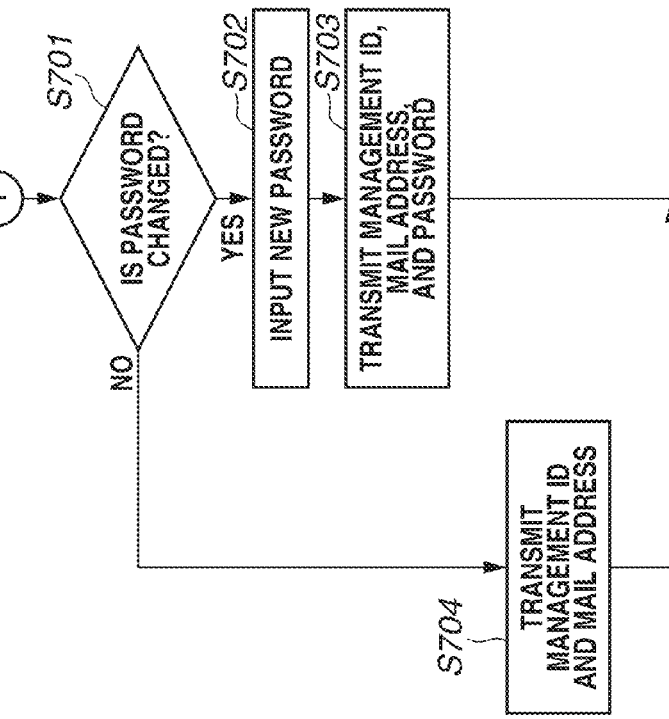

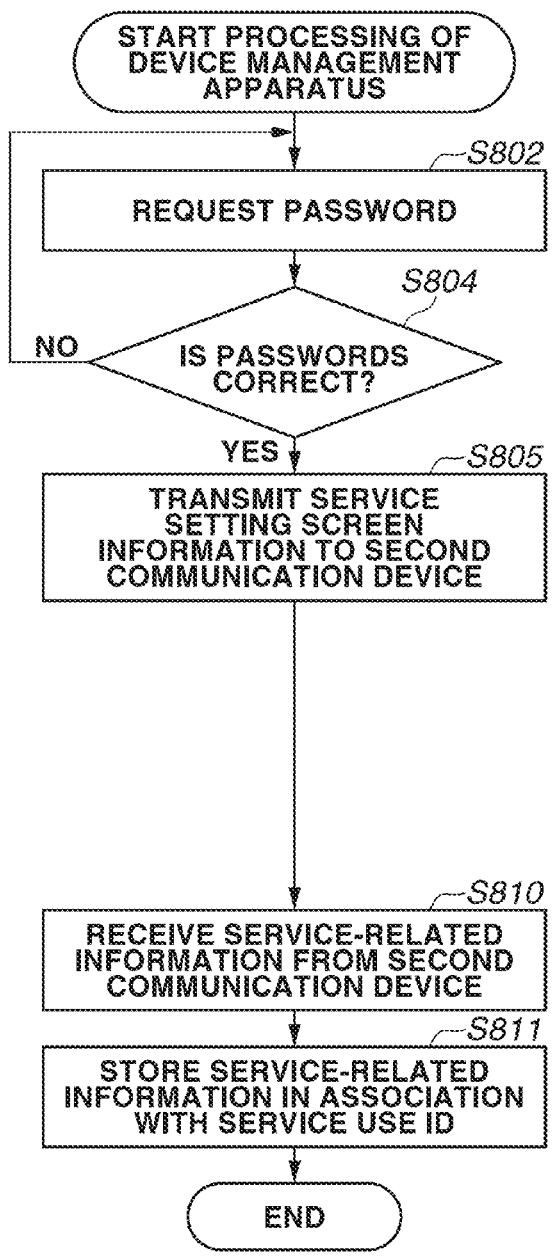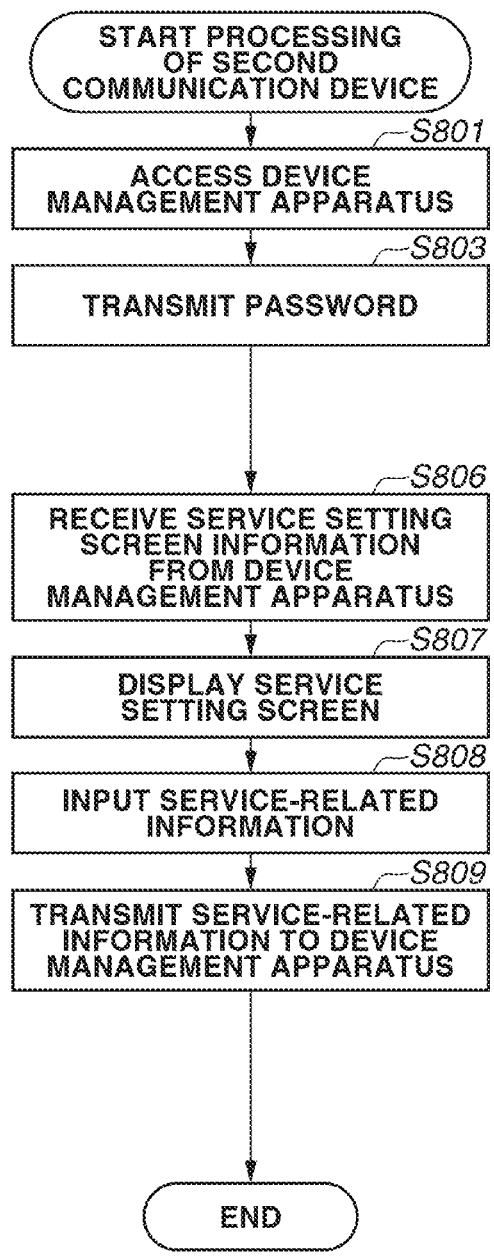

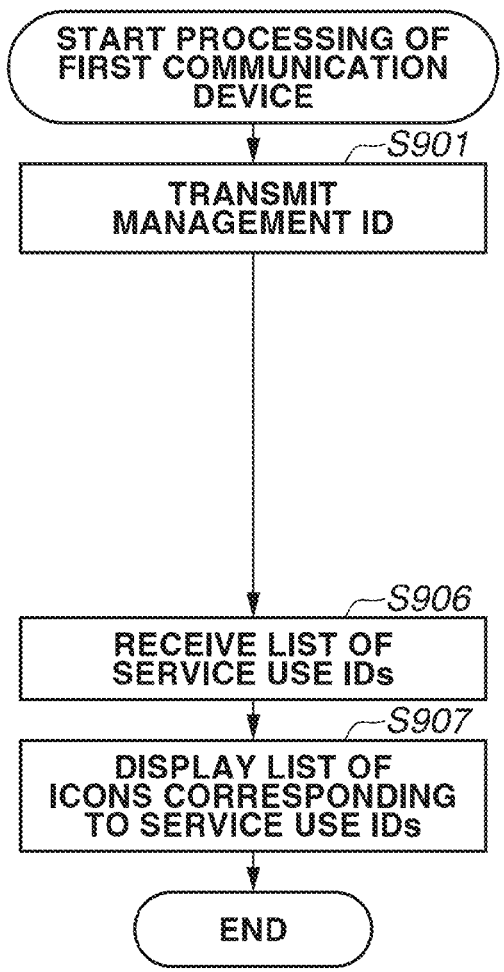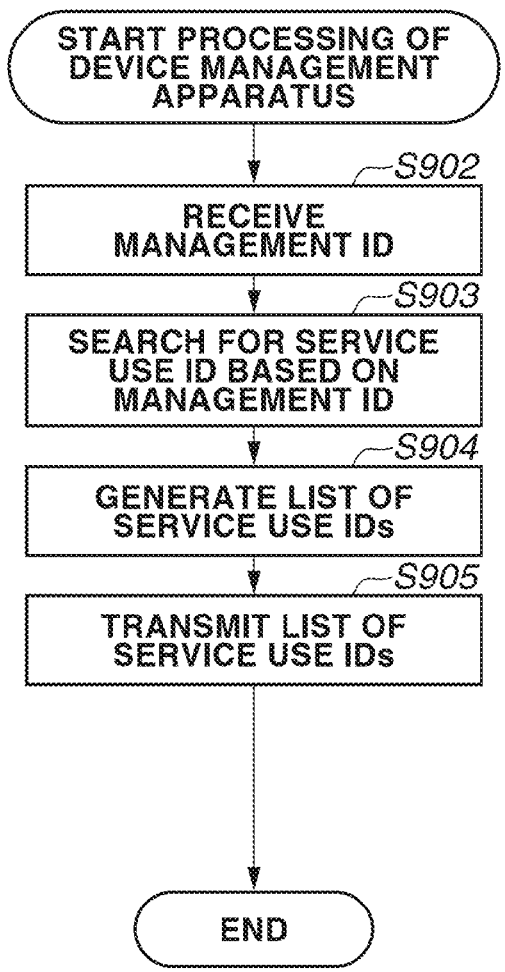

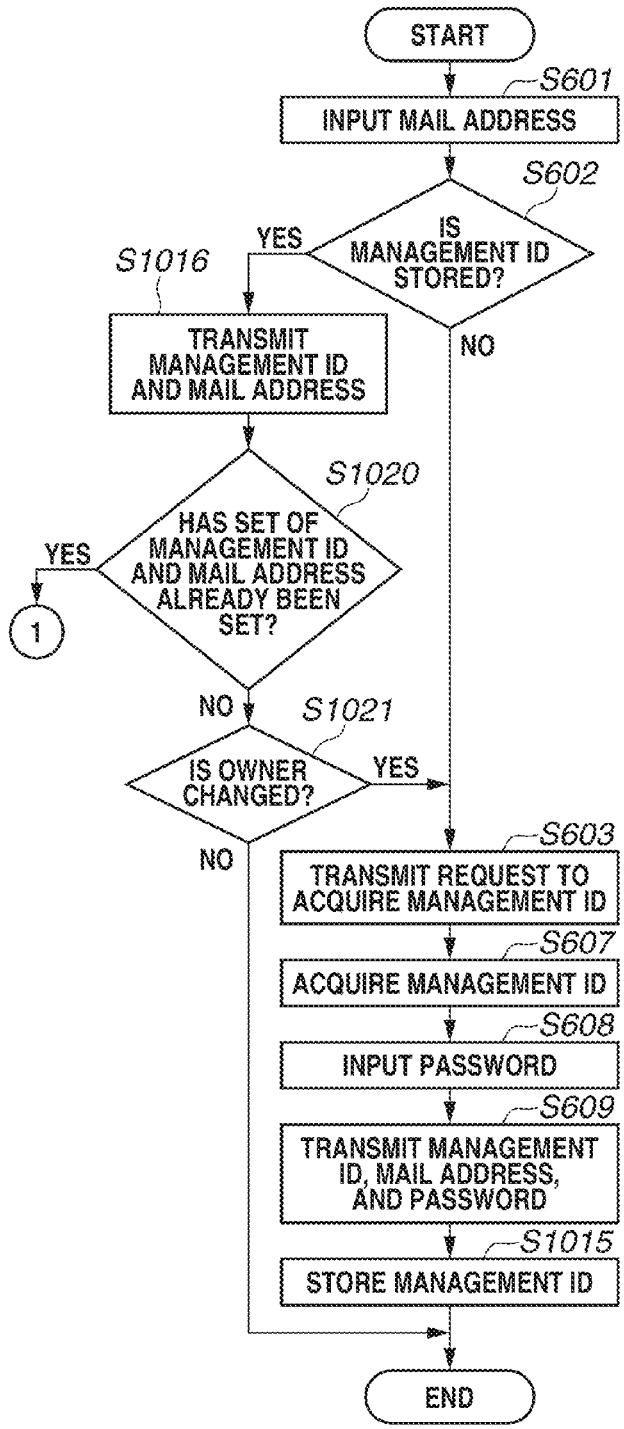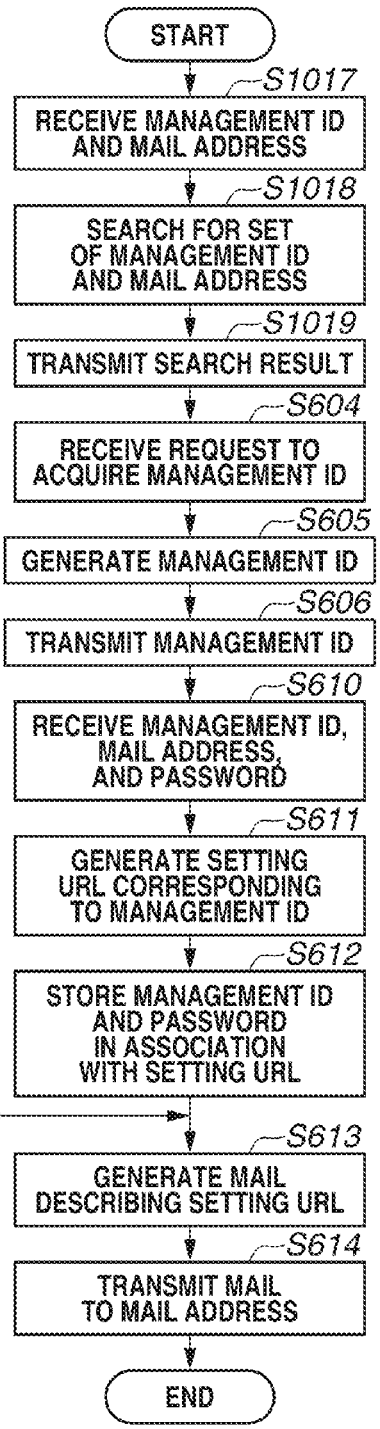

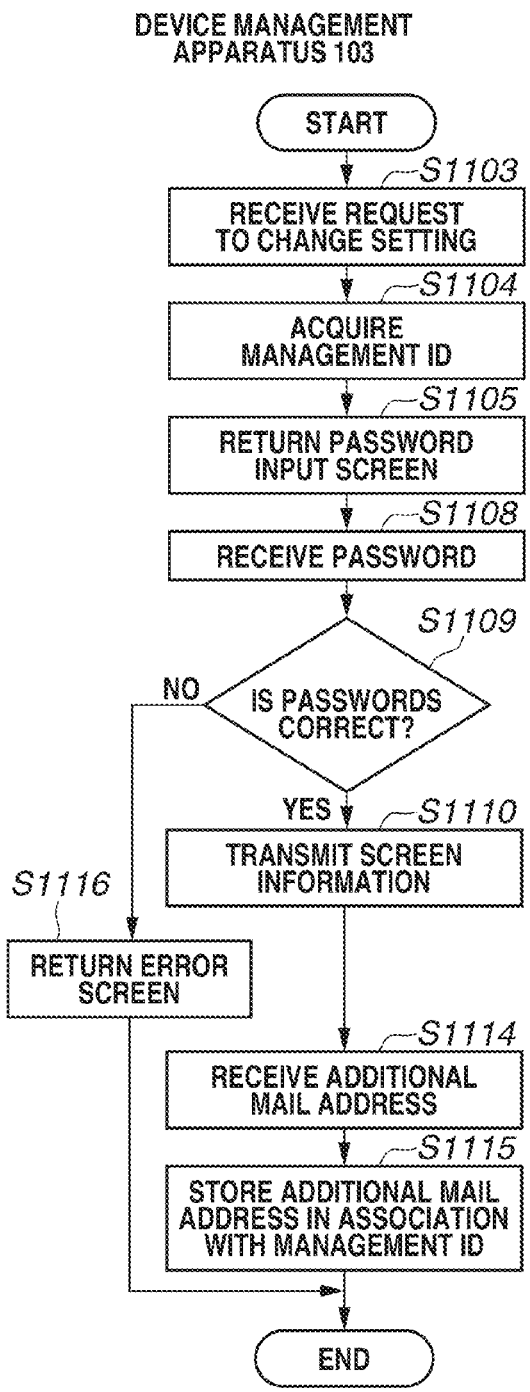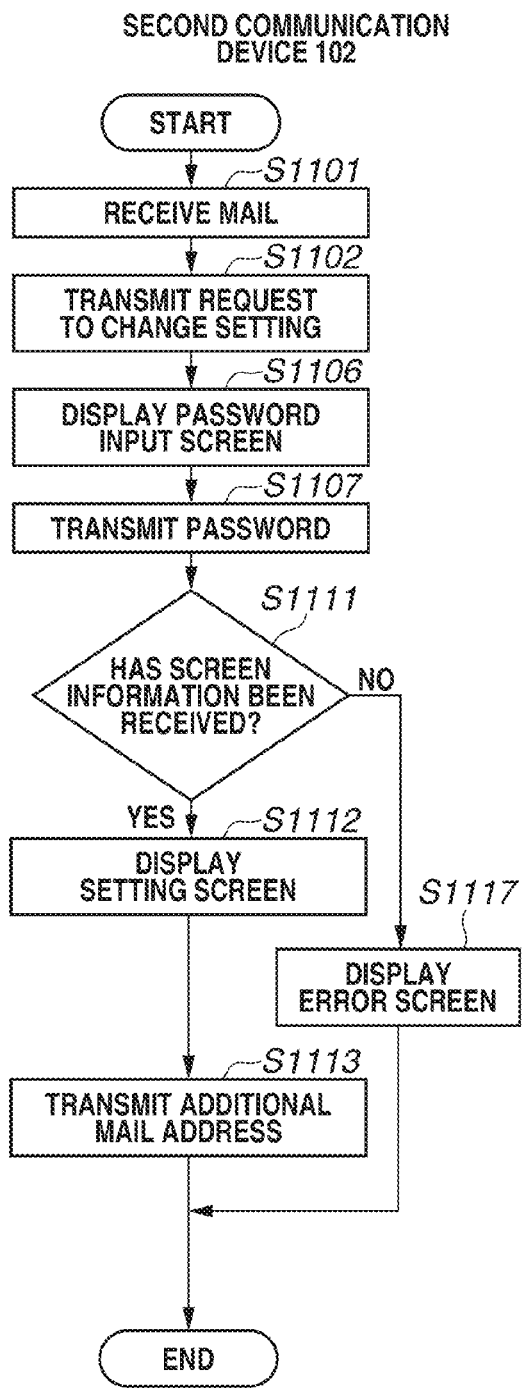

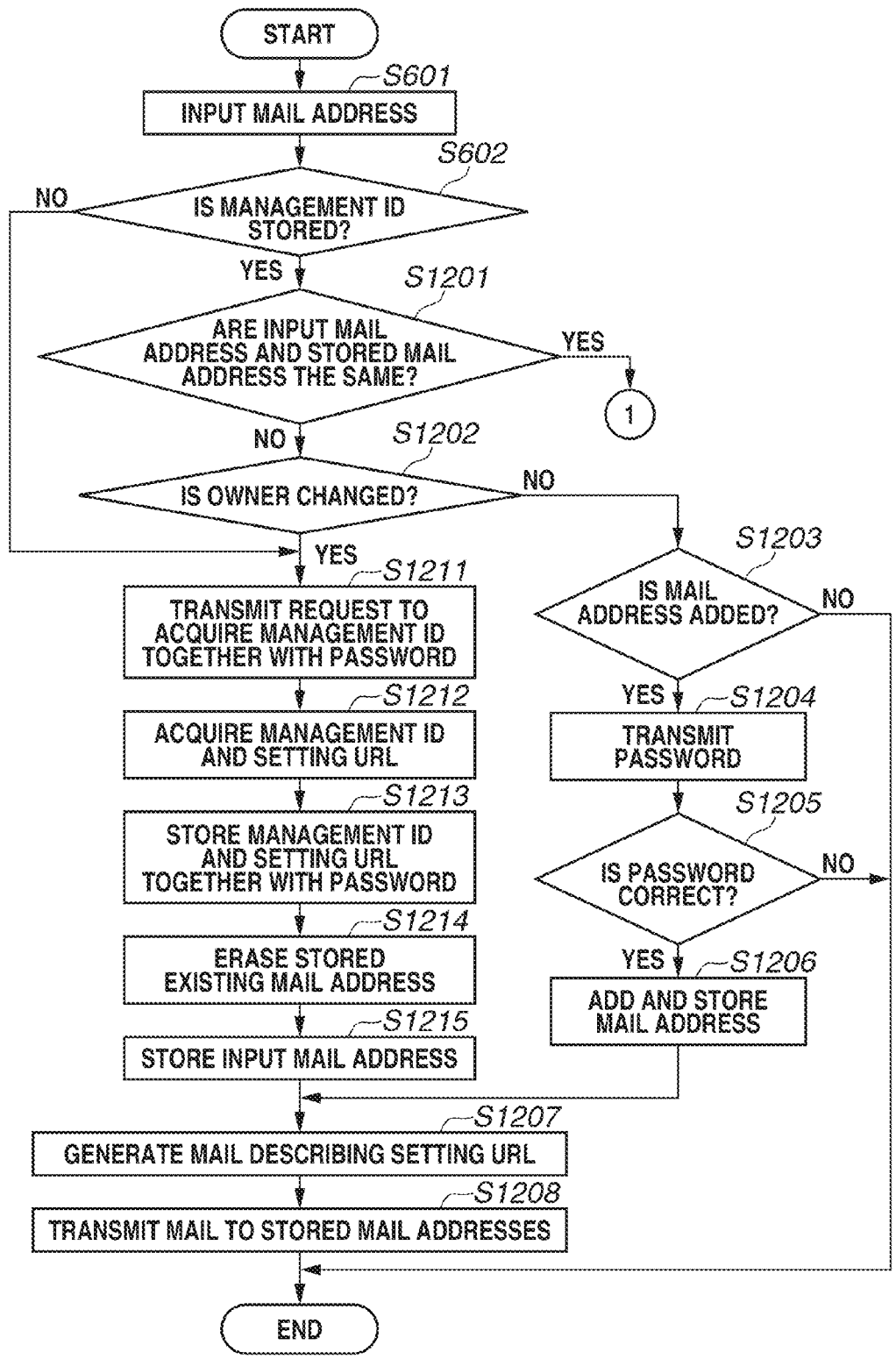

FIG.13

| NOTIFICATION MAIL ADDRESS | USE | EDIT | |
|---|---|---|---|
| abc@def.gh | USED | DELETE | RETRANSMIT |
| xyz@def.gh | NOT USED | DELETE | RETRANSMIT |

MAIL ADDRESS SETTING SCREEN

LIST OF REGISTERED MAIL ADDRESSES

ADD NEW MAIL ADDRESS   OK   CANCEL

DEVICE MANAGEMENT SYSTEM, DEVICE MANAGEMENT APPARATUS, COMMUNICATION DEVICE, AND CONTROL METHODS THEREFOR, AND STORAGE MEDIUM

BACKGROUND

Field

Aspects of the present invention generally relate to a technique for a user to perform setting relating to a communication device using a device management apparatus on a network.

Description of the Related Art

As discussed in Japanese Patent Application Laid-Open No. 6-195307, when a terminal of a user transmits a mail address to a server, the server temporarily registers the mail address, transmits a mail describing a registration format to the temporarily registered mail address. When the server receives information input according to the registration format from the terminal of the user, the server stores the mail address in association with the received information, and thus formally registers the mail address. When the terminal of the user inputs the mail address formally registered, the server provides a corresponding service.

However, the terminal of the user needs to previously input various types of information according to the registration format until the mail address is formally registered, which takes much time and labor. The user cannot use the service using a communication device until input of the various types of information is completed.

SUMMARY

Aspects of the present invention are generally directed to a device management apparatus on a network capable of performing setting relating to a communication device quickly in a smaller number of procedures and allowing the communication device to use a service on the network according to the setting.

According to an aspect of the present invention, a device management system that manages a plurality of communication devices, includes a device management apparatus, and a plurality of communication devices including a first communication device and a second communication device capable of communicating with the device management apparatus via a network, wherein the device management apparatus and the communication devices includes a first receiving unit configured to receive destination information and first identification information corresponding to the first communication device from the first communication device, a first storage unit configured to store address information used for access via the network in association with the first identification information, a first transmission unit configured to transmit the address information according to the destination information, a second transmission unit configured to transmit screen information to the second communication device in response to access from the second communication device using the address information, a second receiving unit configured to receive service-related information input according to the screen information from the second communication device, a second storage unit configured to store the service-related information in association with second identification information for uniquely specifying the service-related information and the first identification information corresponding to the address information, and a notification unit configured to notify the first communication device of the second identification information stored in association with the first identification information.

Further features of the present disclosure will become apparent from the following description of exemplary embodiments with reference to the attached drawings.

BRIEF DESCRIPTION OF THE DRAWINGS

FIGS. 4A, 4B, 4C, 4D, 4E, and 4F each illustrate an example of a screen displayed on the first communication device according to an exemplary embodiment.

FIGS. 5A, 5B, and 5C each illustrate an example of data managed in the device management apparatus according to an exemplary embodiment.

FIGS. 6A and 6B are flowcharts illustrating an example of operations performed in the first communication device and the device management apparatus according to an exemplary embodiment.

FIGS. 7A, 7B, and 7C are flowcharts illustrating an example of operations performed in the first communication device and the device management apparatus according to an exemplary embodiment.

FIGS. 8A and 8B are flowcharts illustrating an example of operations performed in the second communication device and the device management apparatus according to an exemplary embodiment.

FIGS. 9A and 9B are flowcharts illustrating an example of operations performed in the first communication device and the device management apparatus according to the exemplary embodiment.

FIGS. 10A and 10B are flowcharts illustrating an example of operations performed in a first communication device and a device management apparatus according to an exemplary embodiment.

FIGS. 11A and 11B are flowcharts illustrating an example of operations performed in a second communication device and the device management apparatus according to an exemplary embodiment.

FIG. 12 is a flowchart illustrating an example of an operation performed in the first communication device according to an exemplary embodiment.

FIG. 13 illustrates an example of a mail address setting screen according to an exemplary embodiment.

DESCRIPTION OF THE EMBODIMENTS

Various exemplary embodiments will be described in detail below with reference to the drawings. However, components described in the exemplary embodiments are merely illustrative, and are not seen to be limiting.

Figure 1:
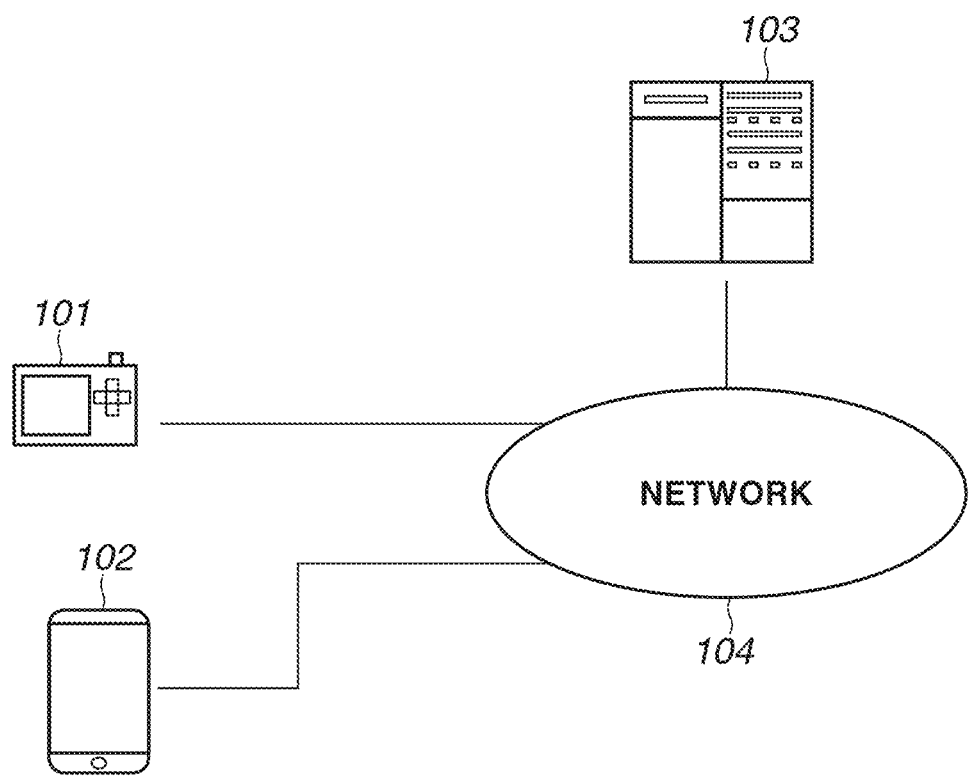
FIG. 1 is a block diagram illustrating an example of a configuration of a device management system according to an exemplary embodiment.

An example of a configuration of a device management system in a first exemplary embodiment will be described with reference to a block diagram of FIG. 1. A first communication device 101 and a second communication device 102 can communicate with a device management apparatus 103 via a network 104. In the present exemplary embodiment, to make the first communication device 101 cooperate with a user serving as a service user, the first communication device 101 and the second communication device 102, which is operated by the user, communicate with the device management apparatus 103. The user who operates the second communication device 102 may operate the first communication device 101, or another user may operate the first communication device 101. The first communication device 101 and the second communication device 102 establish communication with the device management apparatus 103 using a protocol such as a HyperText Transfer Protocol (HTTP), and acquire page information described in a language such as a HyperText Markup Language (HTML) or an Extensible Markup Language (XML), analyze the acquired page information, and display various types of data based on an analysis result. Each of the first communication device 101 and the second communication device 102 may be any device if it has a communication function, and is implemented by a digital camera, a smartphone, a tablet, or a personal computer, for example. The device management apparatus 103 is implemented by a server computer, for example. The device management apparatus 103 may be implemented by a single server computer or may be implemented by distributing its functions among a plurality of server computers, as needed. While a case where the first communication device 101 is a digital camera and the second communication device 102 is a smartphone will be described below as an example in the present exemplary embodiment, the present exemplary embodiment can similarly be implemented when the first communication device 101 and the second communication device 102 are respectively other devices.

In the present exemplary embodiment, when the first communication device 101 and the second communication device 102 are desired to cooperate with each other, a mail address, which can be received by the second communication device 102, is input to the first communication device 101. When the first communication device 101 notifies the device management apparatus 103 of the mail address, the device management apparatus 103 transmits an e-mail describing a setting uniform resource locator (URL) to the mail address. The setting URL is address information used to access the device management apparatus 103 or an external web server when setting relating to the first communication device 101 is performed. The second communication device 102 displays the e-mail according to an operation by the user, and accesses the above-mentioned web server via the network 104 according to the described setting URL. If not only the mail address but also a password is first input to the first communication device 101, access authentication to the web server can also be performed using the password by associating the password with the setting URL. The device management apparatus 103 stores, for each setting URL, i.e., for each combination of the first communication device 101 and the mail address, setting relating to the first communication device 101 set on the web server corresponding to the setting URL in a storage device 234. Details of the present exemplary embodiment will be described below.

Figure 2:
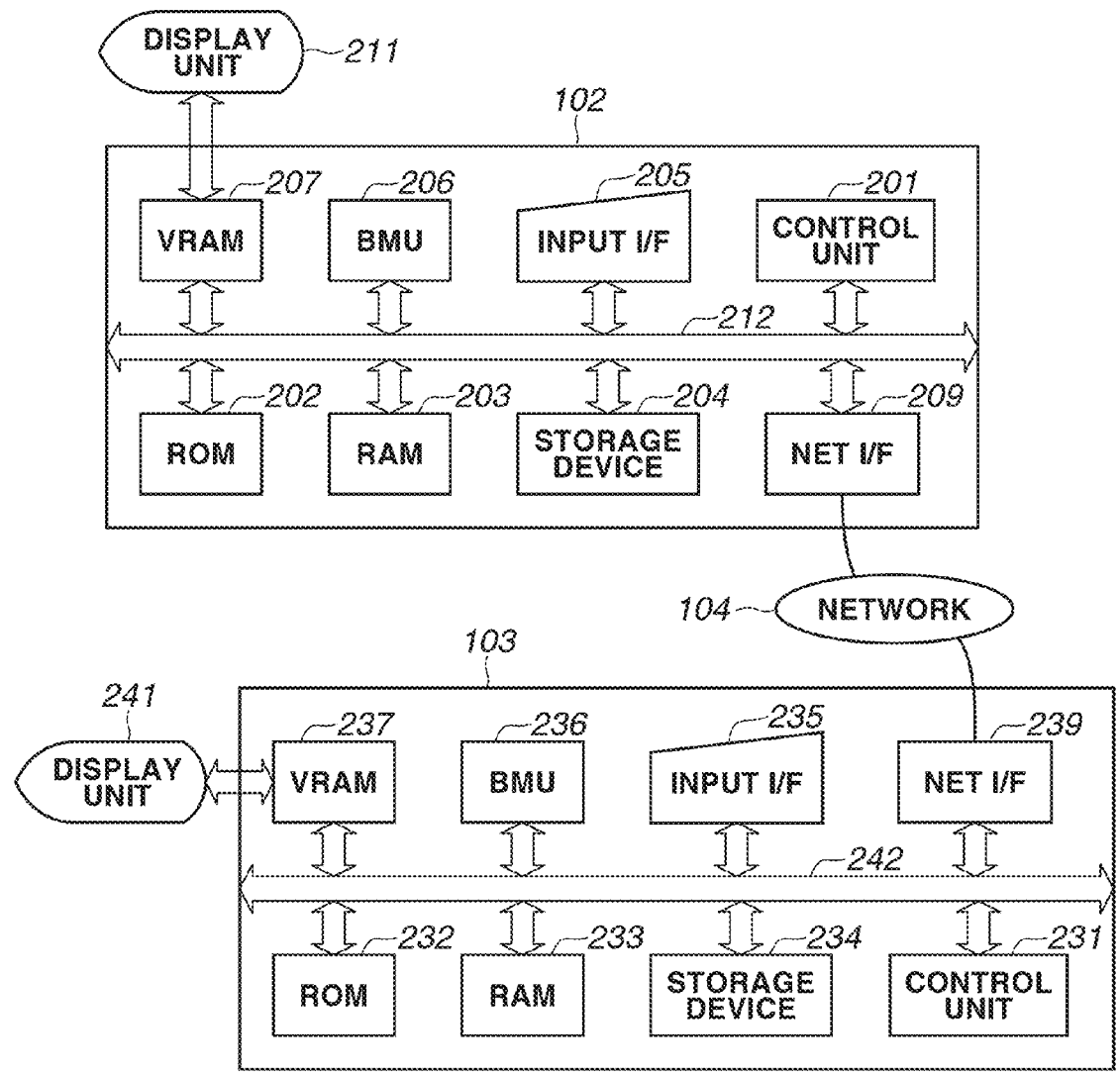
FIG. 2 is a block diagram illustrating an example of a configuration of an information processing apparatus implementing a second communication device and a device management apparatus according to an exemplary embodiment.

An information processing apparatus constituting the server computer serving as the device management apparatus 103 or the smartphone serving as the second communication device 102 will be descried with reference to a block diagram of FIG. 2. Each of the device management apparatus 103 and the second communication device 102 may be implemented by a single information processing apparatus, or may be implemented by distributing its functions among a plurality of information processing apparatuses, as needed. If each of the device management apparatus 103 and the second communication device 102 includes a plurality of information processing apparatuses, the information processing apparatuses are connected to one another via a local area network (LAN) so that they can communicate with one another. In FIG. 2, control units 201 and 231 respectively control the entire second communication device 102 and the entire device management apparatus 103, and are each a central processing unit (CPU). Each of read only memories (ROMs) 202 and 233 stores a program and a parameter that need not be changed. Each of random access memories (RAMs) 203 and 233 temporarily stores a program and data to be supplied from an external apparatus. Storage devices 204 and 234 are hard disk drives (HDDs) respectively fixed to and installed in the second communication device 102 and the device management apparatus 103. Alternatively, each of the storage devices 204 and 234 is a solid-state drive (SSD) including a flash memory or a hybrid drive or a memory card simultaneously using a hard disk and a flash memory. Each of the storage devices 204 and 234 stores a program such as an operating system (OS). Each of input interfaces 205 and 235 receives an operation by the user, and is connected to an input device such as a pointing device, a keyboard, or a touch panel for inputting data. Bit move units (BMUs) 206 and 236 control data transfer, respectively, between memories (e.g., between video RAMs 207 and 237 and the other memories) and between the memory and input/output (I/O) devices (e.g., network interfaces 209 and 239), for example. Video RAMs (VRAMs) 207 and 237 draw images to be respectively displayed on display units 211 and 241. The images generated by the VRAMs 207 and 237 are respectively transmitted to the display units 211 and 241 according to a predetermined definition. Thus, the display units 211 and 241 display the images. The network interfaces 209 and 239 are connected to the network 104. System buses 212 and 242 respectively connect the units 201 to 209 and the units 231 to 239 to be communicable with one another.

Figure 3:
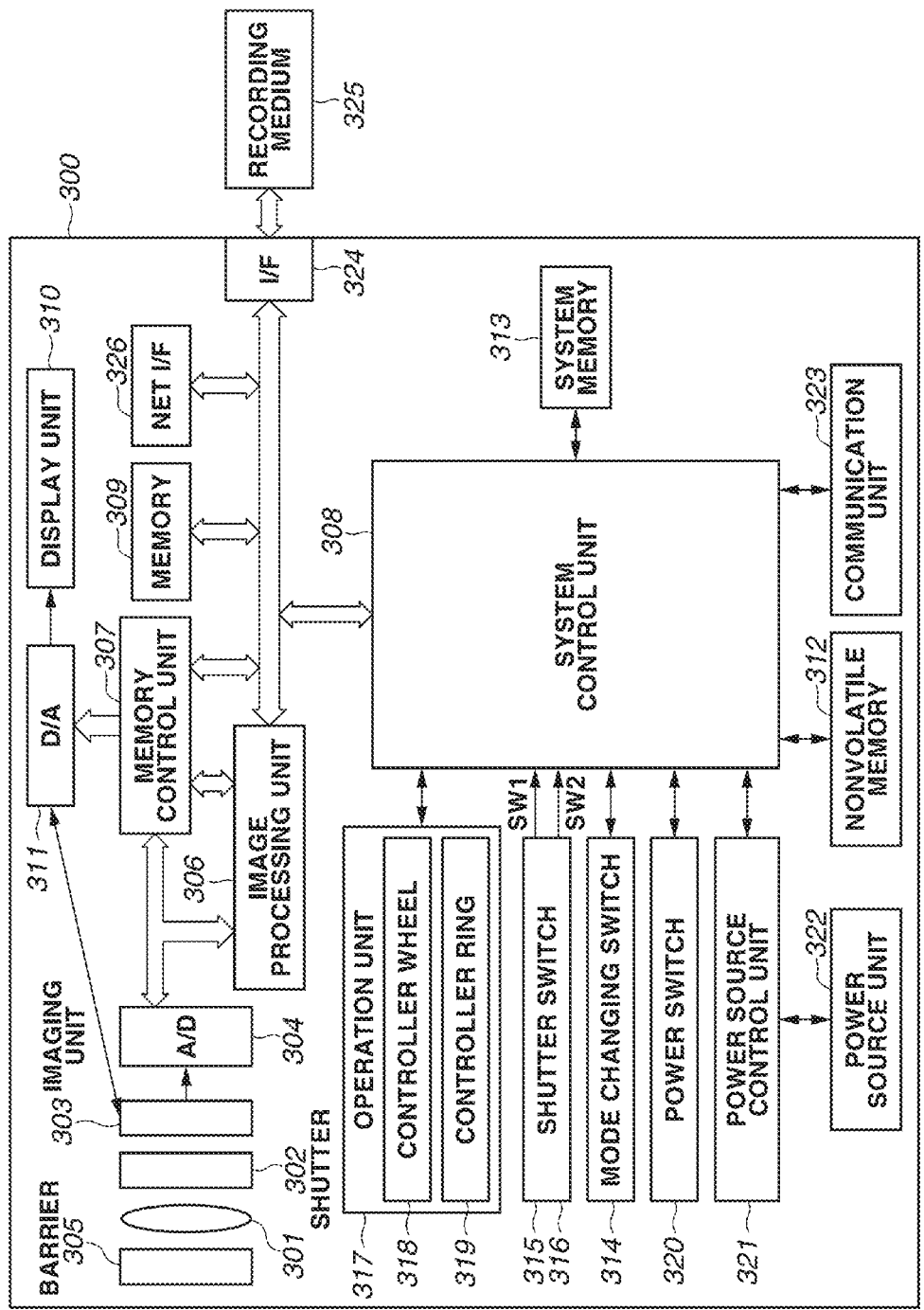
FIG. 3 is a block diagram illustrating an example of a configuration of an imaging apparatus implementing a first communication device according to an exemplary embodiment.

An imaging apparatus constituting the digital camera serving as the first communication device 101 will be described with reference to a block diagram of FIG. 3. The first communication device 101 may be implemented by a single imaging apparatus, or may be implemented by being connected to an external device, as needed, and distributing its functions therebetween. An imaging lens 301 includes a focus lens. A shutter 302 has a diaphragm function. An imaging unit 303 includes a charge coupled device (CCD) or a complementary metal oxide semiconductor (CMOS) device for converting an optical image into an electric signal. An analog-to-digital (A/D) converter 304 converts an analog signal output from the imaging unit 303 into a digital signal. A barrier 305 covers the imaging lens 301, to prevent an imaging system including the imaging lens 301, the shutter 302, and the imaging unit 303 from being made dirty and damaged. An image processing unit 306 performs predetermined pixel interpolation, resize processing such as reduction, and color conversion processing for image data from the A/D converter 304 or image data from a memory control unit 307. The image processing unit 306 performs predetermined calculation processing using image data obtained by imaging, and a system control unit 308 performs exposure control and range finding control based on a calculation result. The image data output from the A/D converter 304 is written into a memory 309 via the image processing unit 306 and the memory control unit 307 or via only the memory control unit 307. The memory 309 stores image data obtained by the imaging unit 303 and converted into digital data by the A/D converter 304 and image data to be displayed on a display unit 310. The memory 309 has a sufficient storage capacity to store a predetermined number of still images, a moving image in a predetermined period of time, and a voice. The memory 309 is also used as a memory for image display (a video memory). A digital-to-analog (D/A) converter 311 converts image data for image display stored in the memory 309 into an analog signal and supplies the analog signal to the display unit 310. Thus, the display unit 310 displays the image data for display, which has been written into the memory 309, via the D/A converter 311. The display unit 310 performs display corresponding to the analog signal from the D/A converter 311 on a display unit such as a liquid crystal display (LCD). A nonvolatile memory 312 is an electrically erasable and recordable memory, and includes an electrically erasable and programmable read only memory (EEPROM). The nonvolatile memory 312 stores a constant for operating the system control unit 308 and a control program such as a program for performing processing to be described below. The system control unit 308 controls an entire user device 110. The system control unit 308 executes the program stored in the nonvolatile memory 312, to implement processing of the user device 110. A system memory 313 includes a RAM. The constant or a variable for operating the system control unit 308 and the program read out of the nonvolatile memory 312 are loaded into the system memory 313. A mode changing switch 314, a first shutter switch 315, a second shutter switch 316, and an operation unit 317 are operation means for inputting various types of operation instructions to the system control unit 308. The mode changing switch 314 switches an operation mode of the system control unit 308 into any one of a still image recording mode, a moving image recording mode, and a reproduction mode. The first shutter switch 315 is turned on while a shutter button provided in the first communication device 101 is being operated, i.e., is half-pressed (instructed to prepare imaging), to generate a first shutter switch signal SW1. The second shutter switch 316 is turned on when the operation of the shutter button is completed, i.e., is full-pressed (instructed to perform imaging), to generate a second shutter switch signal SW2. The system control unit 308 starts a series of imaging processing operations performed since a signal was read out of the imaging unit 303 in response to the second shutter switch signal SW2 until image data is written into a recording medium 325. Operation members in the operation unit 317 are assigned functions, as needed, for each scene by selectively operating various functional icons displayed on the display unit 310, respectively, to function as various function buttons. The function buttons include a confirmation button, an end button, a return button, an image advancing button, a jump button, a refinement button, and an attribute change button. When a menu button is pressed, for example, various settable menu screens are displayed on the display unit 310. The user can intuitively perform various types of setting using the menu screens displayed on the display unit 310, a four-direction button, and a SET button. A controller wheel 318 is an operation member, which is operable to rotate, included in the operation unit 317, and is used when a selection item is indicated together with the direction button. The system control unit 308 controls each of components in the first communication device 101 based on a pulse signal. The system control unit 308 can determine an angle at which the controller wheel 318 is operated to rotate and how many times the controller wheel 318 rotates in response to the pulse signal. The controller wheel 318 may be any operation member if it can detect a rotation operation. A controller ring 319 is a rotation operation member included in the operation unit 317, and is operable to rotate on an optical axis around a lens barrel. For example, the controller ring 319 is operated, to generate an electrical pulse signal according to a rotation amount (operation amount). The system control unit 308 controls each of the components in the first communication device 101 based on the pulse signal. When a function switching button in the controller ring 319 included in the operation unit 317 is pressed, a menu screen capable of changing a function to be assigned to the controller ring 319 is displayed on the display unit 310. The controller ring 319 and the controller wheel 318 are used to select a normal mode item and change a value. A power switch 320 is switched between power-on and power-off. A power source control unit 321 includes a battery detection circuit, a direct current-direct current (DC-DC) converter, and a switch circuit for switching a block to be energized. The power source control unit 321 detects whether a battery is mounted, the type of the battery, and a remaining battery capacity, controls the DC-DC converter based on a detection result and an instruction from the system control unit 308, and supplies a required voltage to each of the components including the recording medium 325 for a required period. A power source unit 322 includes a primary battery such as an alkali battery or a lithium battery, a secondary battery such as a nickel-cadmium (NiCd) battery, a nickel-metal hydride (NiMH) battery, and a lithium (Li) battery, and an alternating current (AC) adaptor. A communication unit 323 transmits an image stored in the recording medium 325 to the external device. An interface 324 is an interface with the recording medium 325. The recording medium 325 includes a semiconductor memory and a magnetic disk. A network interface (I/F) 326 is controlled by the system control unit 308, to communicate with the external device via the network 104.

A screen displayed on the display unit 310 in the first communication device 101 will be described with reference to FIG. 4. The user performs a selection operation by operating the operation unit 317 for the first communication device 101. The operation unit 317 may be a cross key. Alternatively, a touch panel may be provided on the display unit 310 and operated.

The first communication device 101 displays a mail address input screen 401 illustrated in FIG. 4A on the display unit 310 upon receiving a predetermined operation by the user. The first communication device 101 displays a password input screen 421 illustrated in FIG. 4B on the display unit 310 when the user inputs a mail address into an input column 402 and selects an OK button 403. The first communication device 101 transmits, when the user inputs a password into an input column 422 and selects an OK button 423, the mail address and the password to the device management apparatus 103.

The device management apparatus 103 transmits an e-mail describing a setting URL to the mail address when it has received the mail address and the password from the first communication device 101. When the device management apparatus 103 has transmitted the mail address, the first communication device 101 displays a message screen 431 as illustrated in FIG. 4C on the display unit 310. Then, the first communication device 101 displays a completion notification screen 441 as illustrated in FIG. 4D on the display unit 310. An icon 442 is displayed on the completion notification screen 441.

When cancel buttons 404 and 424 are selected in FIGS. 4A and 4B, the processing is cancelled.

Processing in the first communication device 101 and the device management apparatus 103 will be described with reference to flowcharts illustrated in FIGS. 6A and 6B. An operation of the first communication device 101 is implemented when the system control unit 308 executes a control program stored in the nonvolatile memory 312 and controls each of modules, described above, according to the control program. An operation of the management apparatus 103 is implemented when the control unit 231 executes a control program stored in the ROM 232 or the storage device 234 and controls each of the modules, described above, according to the control program. The same is true for flowcharts illustrated in FIGS. 7A, 7B, and 7C, described below.

The system control unit 308 in the first communication device 101 starts setting request processing in response to a predetermined operation by the user. In step S601, the system control unit 308 displays the mail address input screen 401 on the display unit 310, and inputs a mail address as destination information in response to an input operation by the user. In step S602, the system control unit 308 refers to the nonvolatile memory 312, and determines whether a management ID is retained. If the management ID has not been retained (NO in step S602), then in step S603, the system control unit 308 transmits a request to acquire the management ID to the device management apparatus 103. The management ID is identification information for the device management apparatus 103 to uniquely identify the first communication device 101.

In step S604, the control unit 231 in the device management apparatus 103 receives the request to acquire the management ID from the first communication device 101. In step S605, the control unit 231 newly generates a unique management ID. In step S606, the control unit 231 transmits the management ID to the first communication device 101.

In step S607, the system control unit 308 acquires the management ID from the device management apparatus 103. In step S608, the system control unit 308 displays the password input screen 421 as illustrated in FIG. 4B on the display unit 310, and inputs a password in response to an input operation by the user. In step S609, the system control unit 308 transmits the mail address input in step S601, the management ID received in step S607, and the password, which has been input in step S608, to the device management apparatus 103.

In step S610, the control unit 231 receives the mail address, the management ID, and the password from the first communication device 101. The control unit 231 searches a table in the storage device 234, described below, for a management ID 501 that matches the received mail address, management ID, and password. If there is no management ID 501 that matches the received management ID, then in step S611, the control unit 231 generates a unique setting URL corresponding to the management ID. In step S612, the control unit 231 stores the management ID and the password, which have been received in step S610, in the storage device 234 in association with the setting URL that has been generated in step S611. The storage device 234 stores a table 510 as illustrated in FIG. 5A including a plurality of records each having the management ID 501, a setting URL 502, and a password 503 associated with one another.

In step S613, the control unit 231 generates an e-mail describing the setting URL, which has been generated in step S611, in its text. In step S614, the control unit 231 transmits the generated e-mail to the mail address that has been received in step S610.

In step S615, the system control unit 308 stores the management ID, which has been received in step S607, and the mail address, which has been transmitted in step S609, in the nonvolatile memory 312. The nonvolatile memory 312 stores a table 520 as illustrated in FIG. 5B including a plurality of records each having a management 521 and a mail address 522 associated with each other.

On the other hand, if the management ID has already been stored in the nonvolatile memory 312 (YES in step S602), then in step S616, the system control unit 308 determines whether the mail address is also stored in the nonvolatile memory 312. If the mail address has also been stored in the nonvolatile memory 312 (YES in step S616), then in step S617, the system control unit 308 determines whether the mail address, which has been input in step S601, is the same as the mail address that has already been stored in the nonvolatile memory 312. If the mail addresses are the same (YES in step S617), the system control unit 308 performs password change processing, described below. If the mail addresses differ from each other (NO in step S617), then in step S618, the system control unit 308 displays an owner change confirmation screen 461 illustrated in FIG. 4E on the display unit 310, and determines whether the user who operates the first communication device 101 is changed according to a selection operation by the user. If a YES button 462 is selected, the system control unit 308 determines that the user is changed (YES in step S618), and the processing proceeds to step S603. If a NO button 463 is selected, the system control unit 308 determines that the user is not changed (NO in step S618), and the processing ends.

The system control unit 308 displays a password change confirmation screen 471 as illustrated in FIG. 4F on the display unit 310, and determines whether the password associated with the setting URL corresponding to the first communication device 101 is changed according to a selection operation by the user. If a YES button 472 is selected, the system control unit 308 determines that the password is changed (YES in step S701), and the processing proceeds to step S702. In step S702, the system control unit 308 inputs a new password according to an input operation by the user. In step S703, the system control unit 308 transmits the management ID and the mail address, which are stored in the nonvolatile memory 312, and the new password, which has been input in step S702, to the device management apparatus 103.

In step S731, the control unit 231 receives the management ID, the mail address, and the new password from the first communication device 101. In step S732, the control unit 231 changes the password 503 associated with the management ID 501, which matches the received management ID, in the table 510 in the storage device 234 into a new password and stores the new password. In step S733, the control unit 231 reads out the setting URL 502 associated with the management ID 501, and the processing proceeds to step S613.

On the other hand, if a NO button 473 is selected, the system control unit 308 determines that the password is not changed (No in step S701), and the processing proceeds to step S704. In step S704, the control unit 231 transmits the management ID and the mail address, which are stored in the nonvolatile memory 312, to the device management apparatus 103.

In step S741, the control unit 231 receives the management ID and the mail address from the first communication device 101. In step S742, the control unit 231 reads out the setting URL 502 stored in association with the management ID 501 in the table 510 in the storage device 234. Thus, the user can receive the same setting URL again even when the second communication device 102 has lost the setting URL previously received.

An operation for setting a content of a service to be used in the first communication device 101 by the second communication device 102 for the device management apparatus 103 will be described below with reference to FIG. 8.

An operation of the second communication device 102 is implemented when the control unit 201 executes a control program stored in the storage device 204 or the ROM 202 and controls each of the modules, described above, according to the control program. An operation of the device management apparatus 103 is implemented when the control unit 231 executes a control program stored in the storage device 234 or the ROM 232 and controls each of the modules, described above, according to the control program.

In step S801, the control unit 201 in the second communication device 102 starts a web browser, to access the device management apparatus 103 via the network 104 based on a setting URL. In step S802, the control unit 231 in the device management apparatus 103 transmits screen information for displaying a password input screen to the second communication device 102 in response to the access from the second communication device 102, and requests a password. In step S803, the second communication device 102 receives the screen information from the device management apparatus 103, displays the password input screen on the display unit 211, and transmits the password, which has been input by the user, to the device management apparatus 103 according to the display. In step S804, the device management apparatus 103 receives the password from the second communication device 102, refers to the table 510 stored in the storage device 234, and collates the received password with a password corresponding to the setting URL that has been used for the access in step S801. If the received password matches the password corresponding to the setting URL as a result of the collation (YES in step S804), then in step S805, the device management apparatus 103 transmits screen information for displaying a service setting screen to the second communication device 102, and permits the second communication device 102 to input the screen information for displaying the service setting information. In step S806, the control unit 201 receives the screen information for displaying the service setting screen from the device management apparatus 103. In step S807, the control unit 201 displays the service setting screen on the display unit 211. In step S808, the control unit 201 inputs service-related information relating to service setting in response to an operation by the user. In step S809, the control unit 201 transmits the input service-related information to the device management apparatus 103. The service-related information includes a name for uniquely identifying another site serving as a transfer destination of an image of the first communication device 101 and account information in the site, or a mail address.

In step S810, the control unit 231 receives the service-related information from the second communication device 102. In step S811, the control unit 231 stores the received service-related information in the storage device 234 in association with a service use ID. The service use ID is identification information for uniquely specifying service-related information about the user, and is stored in the storage device 234 in association with a management ID corresponding to the setting URL that has been used for the access in step S801.

On the other hand, if the received password does not match the password corresponding to the setting URL as a result of the collation (NO in step S804), the processing returns to step S802. In step S802, the control unit 231 requests a password of the second communication device 102 again. The number of times an erroneous password has been continuously received is counted. If the counted number of times reaches a predetermined number of times, the processing may end.

On the service setting screen, the control unit 231 can not only input the new service-related information but also update existing service-related information.

Service setting processing in the first communication device 101 and the device management apparatus 103 will be described below with reference to FIG. 9. An operation of the first communication device 101 is implemented when the system control unit 308 executes a control program stored in the nonvolatile memory 312 and controls each of the modules, described above, according to the control program. An operation of the device management apparatus 103 is implemented when the control unit 231 executes a control program stored in the storage device 234 or the ROM 232 and controls each of the modules, described above, according to the control program.

First, in step S901, the system control unit 308 in the first communication device 101 reads out a management ID from the nonvolatile memory 312 in response to an operation for selecting the icon 442 on the completion notification screen 441 illustrated in FIG. 4D, and transmits the read management ID to the device management apparatus 103. In step S902, the control unit 231 in the device management apparatus 103 receives the management ID from the first communication device 101. In step S903, the control unit 231 searches for the service use ID stored in the storage device 234 in association with the management ID. In step S904, the control unit 231 generates a list of service use IDs according to a search result. In step S905, the control unit 231 transmits the list of service use IDs to the first communication device 101. In step S906, the system control unit 308 receives the list of service use IDs from the device management apparatus 103. In step S907, the system control unit 308 displays icons corresponding to the service use IDs as a list on the display unit 310.

The icons displayed as a list are marks corresponding to a content of service setting associated with the service use IDs. When the first communication device 101 uploads an image to the device management apparatus 103, for example, the service use ID corresponding to the icon selected by the user is also transmitted. Thus, the device management apparatus 103 transfers the uploaded image to another apparatus according to the service setting associated with the service use ID.

In the present exemplary embodiment, a case where the device management apparatus 103 generates the unique management ID in step S605 has been described. In another exemplary embodiment, the first communication device 101 may generate the unique management ID instead of the device management apparatus 103. Thus, processing for transmitting and receiving the management ID between the first communication device 101 and the device management apparatus 103 can be omitted. When the first communication device 101 generates the management ID, the first communication device 101 acquires or previously stores information representing a rule for generating the unique management ID, and generates the management ID according to the information.

In the present exemplary embodiment, a case where the first communication device 101 retains the mail address, which has been transmitted in step S609, in step S615 has been described. In another exemplary embodiment, the device management apparatus 103 may retain the mail address, which has been received in step S610, instead of the first communication device 101. In this case, the device management apparatus 103 stores a table 530 as illustrated in FIG. 5C, further storing a mail address 534 in association with the management ID 501 in the storage device 234. The device management apparatus 103 also performs the determination processing in steps S616 and S617, transmits a determination result to the first communication device 101, and performs the subsequent processing according to the determination result instead of the first communication device 101. Processing for transmitting and receiving the mail address between the first communication device 101 and the device management apparatus 103 can be omitted in steps S703, S731, S704, and S741. On the other hand, the device management apparatus 103 also reads out the mail address from the storage device 234 in steps S733 and S742.

In the present exemplary embodiment, a case where the device management apparatus 103 generates the mail in step S613, and transmits the mail to the mail address in step S614 has been described. In another exemplary embodiment, the first communication device 101 may generate and transmit the mail instead of the device management apparatus 103. In this case, the first communication device 101 receives the setting URL, which has been generated in step S611, from the device management apparatus 103, generates an e-mail describing the received setting URL in its text, and transmits the generated e-mail to the mail address that has been input in step S601. The processing for transmitting and receiving the mail address between the first communication device 101 and the device management apparatus 103 can be omitted in steps S609, S610, S703, S731, S704, and S742.

In the present exemplary embodiment, a case where the device management apparatus 103 generates the mail in step S613 and transmits the mail to the mail address in step S614 has been described. In another exemplary embodiment, the device management apparatus 103 may notify the first communication device 101 of the setting URL without generating and transmitting the mail describing the setting URL. In this case, the processing for generating the mail in step S613 and transmitting the mail to the mail address in step S614 can be omitted. The device management apparatus 103 transmits the setting URL, which has been generated in step S611, to the first communication device 101. The first communication device 101 displays the received setting URL on the display unit 310. Thus, the user accesses the web server for performing setting relating to the first communication device 101 using a desired device based on the displayed setting URL.

In a second exemplary embodiment, a case where a user can set, when the user owns a plurality of mail addresses, the plurality of mail addresses in association with one management ID and receive a unique setting URL associated with the management ID using the mail addresses will be described. Description of similar processing to that in the first exemplary embodiment is not repeated, and processing specific to the present exemplary embodiment will be specifically described.

Processing in a first communication device 101 and a device management apparatus 103 will be described with reference to a flowchart of FIG. 10. An operation of the first communication device 101 is implemented when a system control unit 308 executes a control program stored in a nonvolatile memory 312 and controls each of modules, described above, according to the control program. An operation of the device management apparatus 103 is implemented when a control unit 231 executes a control program stored in a ROM 232 or a storage device 234 and controls each of the modules, described above, according to the control program.

The system control unit 308 in the first communication device 101 starts processing for requesting setting in response to a predetermined operation by a user, to display a mail address input screen 401 on a display unit 310. The system control unit 308 performs processing in steps S601 to S603, described above. The control unit 231 in the device management apparatus 103 performs processing in steps S604 to S606. The system control unit 308 then performs processing in steps S607 to S609, and the control unit 231 performs processing in steps S610 to S614.

In step S1015, the system control unit 308 stores a management ID, which has been received in step S607, in the nonvolatile memory 312.

On the other hand, if a management ID has already been stored in the nonvolatile memory 312 (YES in step S602), then in step S1016, the system control unit 308 transmits the management ID, which has been read out of the nonvolatile memory 312, and the mail address, which has been input in step S601, to the device management apparatus 103. In step S1017, the control unit 231 receives the management ID and the mail address from the first communication device 101. In step S1018, a table 520 stored in the storage device 234 is searched for a set of the management ID and the mail address. In step S1019, the control unit 231 transmits a search result to the first communication device 101.

In step S1020, the system control unit 308 determines whether the set of the management ID and the mail address, which have been transmitted in step S1016, has already existed in the storage device 234 based on the search result that has been received from the device management apparatus 103. If the set of the management ID and the mail address has existed, the system control unit 308 determines that the set of the management ID and the mail address has already been set (YES in step S1020), and the processing proceeds to step S701. On the other hand, if the set of the management ID and the mail address has not existed, the system control unit 308 determines that the set of the management ID and the mail address has not yet been set (NO in step S1020), and the processing proceeds to step S1021. In step S1021, the system control unit 308 displays an owner change confirmation screen 461 illustrated in FIG. 4E on the display unit 310, and determines whether a user (owner) of the first communication device 101 is changed according to a selection operation by the user. If a YES button 462 is selected, the system control unit 308 determines that the user is changed (YES in step S1021), and the processing proceeds to step S603. If a NO button 463 is selected, the system control unit 308 determines that the user is not changed (No in step S1021), and the processing ends.

Processing in a second communication device 102 and the device management apparatus 103 will be described below with reference to a flowchart of FIG. 11. An operation of the second communication device 102 is implemented when a control unit 201 executes a control program stored in a storage device 204 and controls each of the modules, described above, according to the control program. An operation of the device management apparatus 103 is implemented when the control unit 231 executes the control program stored in the ROM 232 or the storage device 234, and controls each of the modules, described above, according to the control program.

In step S1101, the control unit 201 in the second communication device 102 receives an e-mail, which has been transmitted in step S614, from the device management apparatus 103. In step S1102, the control unit 201 inputs a setting URL described in the e-mail into a web browser program, and accesses the device management apparatus 103, which is specified by the setting URL, or an external web server via a network 104, to issue a request to change setting.

In step S1103, the control unit 231 in the device management apparatus 103 receives the request to change setting from the second communication device 102. In step S1104, the control unit 231 searches a table 510 stored in the storage device 234, to acquire a management ID 501 corresponding to the setting URL used for the access. In step S1105, the control unit 231 returns a password input screen to the second communication device 102.

In step S1106, the control unit 201 receives the password input screen from the device management apparatus 103, and displays the received password input screen on a display unit 211. In step S1107, the control unit 201 transmits a password, which has been input to the password input screen, to the device management apparatus 103 in response to an operation by the user.

In step S1108, the control unit 231 receives the password from the second communication device 102. In step S1109, the control unit 231 collates the received password with a password 503 associated with the management ID 501, which has been acquired in step S1104, stored in the table 510. If the received password matches the password 503 as a result of the collation, the control unit 231 determines that the received password is correct (YES in step S1109), and the processing proceeds to step S1110. In step S1110, the control unit 231 transmits screen information for displaying a mail address setting screen 1301 illustrated in FIG. 13 to the second communication device 102.

In step S1111, the control unit 201 determines whether the screen information has been received from the device management apparatus 103. If the screen information has been received (YES in step S1111), then in step S1112, the control unit 201 displays a setting screen on the display unit 211. In step S1113, the control unit 201 transmits an additional mail address, which has been input to the setting screen in response to an operation by the user, to the device management apparatus 103.

In step S1114, the control unit 231 receives the additional mail address from the second communication device 102. In step S1115, the control unit 231 stores the additional mail address in the table 510 in association with the management ID 501 that has been acquired in step S1104, and the processing ends.

On the other hand, if the password, which has been received in step S1108, and the password 503, which is stored in the table 510 in association with the management ID 501, do not match each other, the control unit 231 determines that the password is erroneous (No in step S1109), and the processing proceeds to step S1116. In step S1116, the control unit 231 returns an error screen to the device management apparatus 103, and the processing ends. If the control unit 201 receives not the setting screen but the error screen from the device management apparatus 103 (NO in step S1111), then in step S1117, the control unit 201 displays the error screen on the display unit 211, and the processing ends.

In the present exemplary embodiment, a case where the additional mail address is stored in association with the management ID has been described. Further, the user performs a predetermined operation on the setting screen, to input a request to change or delete the existing mail address and enable the device management apparatus 103 to change or delete the mail address.

The e-mail may be transmitted to not only the mail address, which has been received in step S614, but also another mail address that has been set in association with the management ID.

As described above, the plurality of mail addresses can be set in association with the management ID. Accordingly, the e-mail describing the setting URL corresponding to the management ID is transmitted to a plurality of mail addresses desired by the user. The user can perform setting relating to the first communication device 101 using a plurality of devices corresponding to the mail addresses.

While a case where the device management apparatus 103 transmits the e-mail to the mail address associated with the management ID has been described above, the first communication device 101 may transmit the e-mail instead of the device management apparatus 103. This case will be described with reference to FIG. 12. An operation of the first communication device 101 is implemented when the system control unit 308 executes a control program stored in the nonvolatile memory 312 and controls each of the modules, described above, according to the control program. An operation of the device management apparatus 103 is implemented when the control unit 231 executes a control program stored in the ROM 232 or the storage device 234 and controls each of the modules, described above, according to the control program.

The system control unit 308 performs the processing in step S601 and S602. If the management ID has been retained (YES in step S602), then in step S1201, the system control unit 308 compares the mail address, which has been input in step S601, with the mail address that is stored in the nonvolatile memory 312, and determines whether the mail addresses are the same. If the mail addresses differ from each other (NO in step S1201), then in step S1202, the system control unit 308 determines whether the owner is changed in response to an operation by the user. If the owner is not changed (NO in step S1202), then in step S1203, the system control unit 308 determines whether a mail address is added in response to an operation by the user. If the mail address is added (YES in step S1203), then in step S1204, the system control unit 308 inputs a password in response to an operation by the user, and transmits the input password to the device management apparatus 103. In step S1205, the system control unit 308 receives an authentication result of the password from the device management apparatus 103, and determines whether the password is correct. If the password is correct (YES in step S1205), then in step S1206, the system control unit 308 additionally retains the mail address, which has been input in step S601, to and in the nonvolatile memory 312. In such a manner, the system control unit 308 stores one or more mail addresses as a list in the nonvolatile memory 312.

If the owner is changed (YES in step S1202), then in step S1211, the system control unit 308 transmits a request to acquire a management ID, together with the password that has been input in response to the operation by the user, to the device management apparatus 103. The device management apparatus 103 generates a unique management ID and a unique setting URL, and transmits the management ID and the setting URL to the first communication device 101. In step S1212, the system control unit 308 acquires the management ID and the setting URL from the device management apparatus 103. In step S1213, the system control unit 308 stores the management ID and the setting URL, together with the password, in the nonvolatile memory 312. In step S1214, the system control unit 308 erases the existing mail address from the nonvolatile memory 312. In step S1215, the system control unit 308 newly stores the mail address, which has been input in step S601, in the nonvolatile memory 312.

In step S1207, the system control unit 308 generates an e-mail describing the setting URL that has been acquired in step S1212. In step S1208, the system control unit 308 transmits the e-mail to one or more mail addresses, which have been stored in the nonvolatile memory 312, in association with the management ID that has been acquired in step S1212.

If the mail address, which has been input in step S601, is the same as the mail address that has been stored in the nonvolatile memory 312 (YES in step S1201), and the password is changed (YES in step S701), then in step S702, the system control unit 308 inputs a new password in response to an operation by the user. In step S703, the system control unit 308 transmits the management ID and the password to the device management apparatus 103, and the processing proceeds to step S1207. The mail address is not transmitted in step S703. If the password is not changed (NO in step S701), the processing in step S704 is not performed, and the processing proceeds to step S1207.

In a third exemplary embodiment, a case where a device management apparatus 103 manages, when the device management apparatus 103 can store a plurality of mail addresses in association with one management ID, whether each of the mail addresses is used will be described with reference to FIGS. 10 and 11. Description of similar processing to that in the above-mentioned exemplary embodiment is not repeated, and processing specific to the present exemplary embodiment will be specifically described.

In the present exemplary embodiment, a control unit 231 in the device management apparatus 103 generates a setting URL in step S611 (FIG. 10), and then adds an argument corresponding to a mail address, which has been received in step S610, to the generated setting URL.

The control unit 231 adds, when the control unit 231 receives an additional mail address in step S1114, an argument corresponding to the additional mail address to the setting URL. Therefore, in step S614 (FIG. 10), for example, an e-mail describing "http://www.xxx.yyy.zz/1" is transmitted to the mail address that has been received in step S610 (FIG. 10). An e-mail describing "http://www.xxx.yyy.zz/2" is transmitted to the additional mail address that has been received in step S1114. Accordingly, the device management apparatus 103 specifies, based on an argument added to the setting URL used for access when the device management apparatus 103 receives a request to change setting in step S1103, the corresponding mail address, and stores information indicating that the mail address is used in a table 520. In the table 520, information indicating that the mail address is not used is stored as an initial value during registration of the mail address.

The control unit 231 transmits a setting screen 1301, as illustrated in FIG. 13, capable of inputting setting relating to all mail addresses associated with the management ID, which has been acquired in step S1104, to the second communication device 102 in step S1110. For each of the mail addresses, information indicating whether the mail address is used is displayed on the setting screen 1301. The second communication device 102 selects any one of the mail addresses displayed on the setting screen 1301, and requests the device management apparatus 103 to delete information about the selected mail address from the table 520 and retransmit the setting URL to the selected mail address. The device management apparatus 103 deletes the information about the designated mail address from a storage device 234 and transmits an e-mail describing the setting URL corresponding to the designated mail address to the mail address according to the request from the second communication device 102.

The control unit 231 in the device management apparatus 103 searches the table 520 for a set of the management ID and the mail address that have been received from the first communication device 101 in step S1108. As a result of the search, if there is a record having the set of the management ID and the mail address, the control unit 231 also acquires the information indicating whether the mail address is used, and transmits the acquired information, included in the search result, to the first communication device 101 in step S1019.

A system control unit 308 in a first communication device 101 further determines, if the system control unit 308 determines that the set of the management ID and the mail address has already been set in step S1020 based on the search result that has been received from the device management apparatus 103, whether the mail address is used. If the mail address, which has been input in step S601 (FIG. 10), has been used, the processing proceeds to step S701. On the other hand, if the mail address, which has been input in step S601, has not been used, the system control unit 308 selects whether the mail address, which has not been used, may be used according to an operation by the user. If the mail address, which has not been used, may be used, the processing proceeds to step S701. Otherwise, the processing ends. If the mail address, which has not been used, may be used, the e-mail may be transmitted to not only the mail address, which has been input in step S601 (FIG. 10), but also another mail address that has been stored in association with the management ID. Thus, the possibility that the user reads the e-mail is enhanced.

In FIG. 5B, a mail address is further stored in association with the date and time when the mail address has been stored. If a predetermined period of time has not elapsed from the date and time, a case where information indicating whether the mail address is used indicates that the mail address has not been used may be handled similarly to a case where the information indicates that the mail address has been used.

The control unit 231 in the device management apparatus 103 may periodically refer to the table 520, and automatically delete data about a mail address indicating that the mail address has not been used even if a predetermined period of time has elapsed from the date and time. Thus, a mail address, which has been erroneously input due to an input error, can be prevented from remaining stored.

As described above, the user can easily grasp, when a user has a plurality of mail addresses and can store the mail addresses in the device management apparatus 103, whether each of the mail addresses has been used, and easily manage the mail addresses.

The above-described exemplary embodiments can be implemented by performing the following processing, i.e., processing for supplying software (a program) to a system or an apparatus via a network or each of various types of storage media, reading out the program by a computer (or a CPU or a microprocessor (MPU)) in the system or the apparatus, and executing the program.

The functions in the above-mentioned exemplary embodiment are implemented not only when the computer executes a read program code but also when an OS operating on the computer performs a part or the whole of actual processing based on indication of the program code, for example. Further, a case where the functions in the above-mentioned exemplary embodiments are implemented by the following processing is also included. First, the program code read out of the storage medium is written into a memory provided in a function expansion board inserted into the computer or a function expansion unit connected to the computer. Then, a CPU provided in the function expansion board or the function expansion unit performs a part of the whole of the actual processing based on the indication of the program code.

According to the present disclosure, the device management apparatus on the network can perform setting relating to the communication device quickly in a smaller number of procedures, and the communication device can use a service on the network according to the setting.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-182076 filed Sep. 3, 2013, which is hereby incorporated by reference herein in its entirety.

What is claimed is:

1. A method for managing a communication device capable of communication via a network, the method comprising:
   receiving a mail address corresponding to a second communication device and first identification information uniquely identifying a first communication device from the first communication device;
   storing uniform resource locator (URL) information used for accessing service-related information via the network in association with the first identification information;
   transmitting the URL information to the second communication device according to the mail address;
   transmitting screen information for the service-related information to the second communication device in response to access from the second communication device using the URL information;
   receiving service-related information input according to the screen information from the second communication device;
   storing the service-related information in association with the first identification information corresponding to the URL information and second identification information for uniquely specifying the service-related information;
   notifying the first communication device of the second identification information stored in association with the first identification information corresponding to the first communication device;
   receiving content data and the second identification information from the first communication device; and
   transmitting the received content data to an external apparatus based on the service-related information stored in association with the received second identification information.

2. The method according to claim 1, further comprising: generating the URL information for the first identification information.

3. The method according to claim 1, further comprising: generating the first identification information; and transmitting the generated first identification information to the first communication device.

4. The method according to claim 1, further comprising:
   receiving a password corresponding to the first identification information from the first communication device;
   storing the received password in association with the first identification information; and
   receiving the password from the second communication device;
   wherein transmitting the screen information includes selectively transmitting the screen information according to a result of verification of the stored password and the received password.

5. The method according to claim 1, wherein the URL information includes an argument for the mail address.

6. A method to be managed by a device management apparatus capable of communication via a network, the method comprising:
   transmitting a mail address and first identification information uniquely identifying a first communication device to the device management apparatus which stores Uniform Resource Locator (URL) information used for accessing service-related information via the network in association with the first identification information, transmits the URL information to a second communication device according to the mail address, transmits screen information for the service-related information to the second communication device in response to access from the second communication device using the URL information, receives the service-related information input according to the screen information from the second communication device and stores the service-related information in association with the first identification information corresponding to the URL information and second identification information for uniquely specifying the service-related information;
   receiving the second identification information from the device management apparatus; and
   transmitting content data and the received second identification information to the device management apparatus, wherein the content data is transmitted to an external apparatus based on the service-related information in association with the second identification information via the device management apparatus.

7. The method according to claim 6, further comprising:
   storing the first identification information and the mail address in association with each other;
   acquiring new first identification information when the mail address stored in association with the first identification information to be transmitted differs from the mail address to be transmitted.

8. A non-transitory computer-readable storage medium storing a computer-executable program for causing a computer to implement a method for managing a communication device capable of communication via a network, the method comprising:
   receiving a mail address corresponding to a second communication device and first identification information uniquely identifying a first communication device from the first communication device;
   storing uniform resource locator (URL) information used for accessing service-related information via the network in association with the first identification information;
   transmitting the URL information to the second communication device according to the mail address;
   transmitting screen information for the service-related information to a second communication device in response to access from the second communication device using the URL information;
   receiving service-related information input according to the screen information from the second communication device;
   storing the service-related information in association with the first identification information corresponding to the URL information and second identification information for uniquely specifying the service-related information;
   notifying the first communication device of the second identification information stored in association with the first identification information corresponding to the first communication device;
   receiving content data and the second identification information from the first communication device; and
   transmitting the received content data to an external apparatus based on the service-related information stored in association with the received second identification information.

9. A non-transitory computer-readable storage medium storing a computer-executable program for causing a computer to implement a method to be managed by a device management apparatus capable of communication via a network, the method comprising:
   transmitting a mail address and first identification information uniquely identifying a first communication device to the device management apparatus which stores URL (Uniform Resource Locator) information used for accessing service-related information via the network in association with the first identification information, transmits the URL information to a second communication device according to the mail address, transmits screen information for the service-related information to the second communication device in response to access from the second communication device using the URL information, receives the service-related information input according to the screen information from the second communication device and stores the service-related information in association with the first identification information corresponding to the URL information and second identification information for uniquely specifying the service-related information; and
   receiving the second identification information from the device management apparatus; and
   transmitting content data and the received second identification information to the device management apparatus,
   wherein the content data is transmitted to an external apparatus based on the service-related information in association with the second identification information via the device management apparatus.

10. A device management apparatus for managing a communication device capable of communication via a network, the device management apparatus comprising:
   a memory configured to store a computer-executable program for causing a computer to implement a method; and
   a processor configured to control the device management apparatus to perform the method according to the program stored in the memory, the method comprising the steps of:
      receiving a mail address corresponding to a second communication device and first identification information uniquely identifying a first communication device from the first communication device;
      storing uniform resource locator (URL) information used for accessing service-related information via the network in association with the first identification information;
      transmitting the URL information to the second communication apparatus according to the mail address;
      transmitting screen information for the service-related information to a second communication device in response to access from the second communication device using the URL information;
      receiving service-related information input according to the screen information from the second communication device;
      storing the service-related information in association with the first identification information corresponding to the URL information and second identification information for uniquely specifying the service-related information;
      notifying the first communication device of the second identification information stored in association with the first identification information corresponding to the first communication device;
      receiving content data and the second identification information from the first communication device; and
      transmitting the received content data to an external apparatus based on the service-related information stored in association with the received second identification information.

11. A communication device to be managed by a device management apparatus capable of communication via a network, the communication device comprising:
   a memory configured to store a computer-executable program and for causing a computer to implement a method; and a processor configured to control the device management apparatus to perform the method according to the program stored in the memory, the method comprising the steps of:
      transmitting a mail address and first identification information uniquely identifying the communication device to the device management apparatus which stores URL (Uniform Resource Locator) information used for accessing service-related information via the network in association with the first identification information, transmits the URL information to a second communication device according to the mail address, transmits screen information for the service-related information to the second communication device in response to access from the second communication device using the URL information, receives the service-related information input according to the screen information from the second communication device and stores the service-related information in association with the first identification information corresponding to the URL information and second identification information for uniquely specifying the service-related information; and receiving the second identification information from the device management apparatus; and transmitting content data and the received second identification information to the device management apparatus, wherein the content data is transmitted to an external apparatus based on the service-related information in association with the second identification information via the device management apparatus.

* * * * *